(No Model.)

P. W. TILLINGHAST.
TIRE FOR VEHICLE WHEELS.

No. 450,952. Patented Apr. 21, 1891.

WITNESSES.
John S. Lynch
George E. Dorgoy

INVENTOR.
Purdon W. Tillinghast
per S. Schofield
Attorney

UNITED STATES PATENT OFFICE.

PARDON W. TILLINGHAST, OF PROVIDENCE, RHODE ISLAND.

TIRE FOR VEHICLE-WHEELS.

SPECIFICATION forming part of Letters Patent No. 450,952, dated April 21, 1891.

Application filed January 26, 1891. Serial No. 379,169. (No model.)

*To all whom it may concern:*

Be it known that I, PARDON W. TILLINGHAST, a citizen of the United States, residing at Providence, in the State of Rhode Island, have invented a new and useful Improvement in Tires for Velocipedes and Similar Vehicles, of which the following is a specification.

My invention relates to an improvement in pneumatic tires, whereby the required pressure of air will be automatically maintained therein; and it consists in the combination with a yielding hollow tire of an air-pump arranged to be operated by the outward movement of the said tire, and also in certain details of construction and combination of parts, as hereinafter fully set forth.

Figure 1:
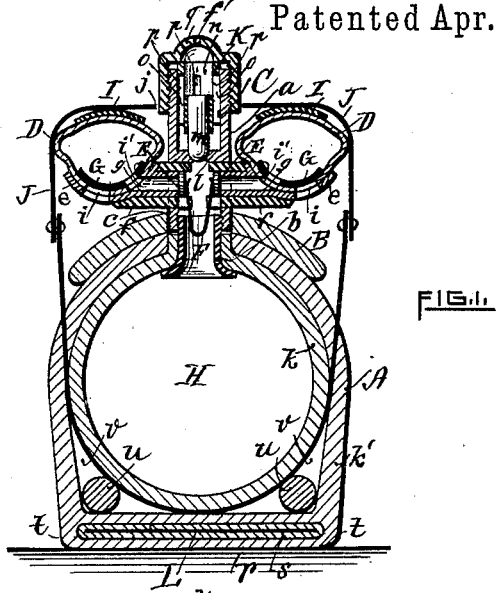
Figure 2:
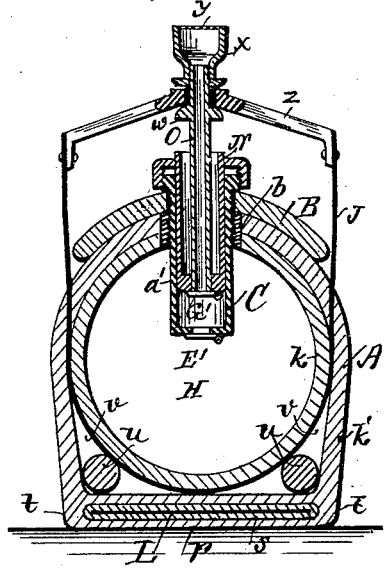

Figure 1 represents a transverse section of a pneumatic tire constructed in accordance with my invention and provided with a double air-pump. Fig. 2 represents a similar transverse section showing a modification in the construction of the pump.

In the accompanying drawings, A represents the flexible hollow tire, which may be of any approved construction and provided with a short metal tube $b$, vulcanized therein, so as to form an air-tight joint around the said tube. The tube $b$ is provided with a screw-thread, which may be made either upon the outside of the tube, as shown in Fig. 1, or upon the inner side, as shown in Fig. 2; and to the tube $b$ is attached an air-pump C, which may also be of any approved construction, and, as shown in Fig. 1, is provided with a centrally-arranged tube $a$, which screws upon the tube $b$, and fits snugly in the perforation $c$ made in the rim B of the wheel of the vehicle.

At each side of the tube $a$ are placed the elastic rubber bulbs D D, held in the concave metal cups $e$ $e$, which are connected with the tube $a$ by means of the tubes $f$ $f$, provided with a lining-tube $g$, which forms a seat for the valve E, the opposite valves E E being held against their respective seats by means of the spring F.

The bulbs D are each provided with an inlet-opening $i$, which is closed by the flap-valve G, and with an outlet-opening $i'$ leading to the valve E, so that upon the swelling of the bulb D after its compression air will be drawn into the cavity of the bulb under the inlet-valve G, and upon the subsequent forcible compression of the said bulb, the air will be forced from the bulb through the tube $g$ and under the valve E to the chamber H of the tire.

At the top of the bulbs D are placed the concave metal shields I, and over the said shields is placed the comparatively narrow strap J, which is perforated at $j$ to loosely receive the upper end of the tube $a$, and passes around the outer side of the inner tube $k$ of the tire, so that upon the outward expansion of the said tire, after inward displacement by pressure, the bulbs D will be compressed to force a portion of the air contained therein into the cavity H of the tube $k$. The pump-tube $a$ is also provided with a perforated diaphragm $l$, which forms a seat for the relief-valve K, which consists of an enlongated rubber head $m$, which forms the elastic face of the valve, and the hollow sliding holder $n$, provided with the outer grooves $o$ $o$ and openings $p$, and upon the upper end of the tube $a$ is secured the screw-cap $q$, which is provided with the narrow opening $f'$, and by screwing the cap $q$ upon the tube $a$ the relief-valve K may be adjusted to spring from its seat at any desired degree of pressure.

The tire, as shown in the drawings, is formed of a continuous inner rubber tube $k$, made of circular, cross-section surrounded by an outer tube $k'$ of the same material, provided with a flattened side $r$, which forms the tread of the tire, the said flattened side being protected against the danger of puncture by sharp or pointed objects and supported against undue lateral movement at the point of contact with the ground by means of the flexible metal band L, which is inclosed in a covering of canvas $s$ and embedded in the rubber of the said tube, and by means of the covering of canvas the metal band L will be prevented from cutting the rubber at the corners $t$ $t$ of the tube $k'$, and in order to properly distend the outer tube $k'$ and support the corners $t$ $t$ of the same against inwardly-directed pressure I arrange the ribs $u$ $u$ between the tubes $k$ and $k'$ in the vacant spaces $v$ $v$, whereby an inward movement of the corner $t$ will be directly communicated to the inner tube $k$.

A modification in the form of the air-pump is shown in Fig. 2, in which the pump-barrel $a'$ is screwed into the tube $b$, the lower end of the said barrel being provided with the outlet-valve E', and the upper end with the stuffing-cap M. Within the pump-barrel a' is placed the hollow piston N, which is provided at its face with the inlet-valve G' and with the hollow piston-rod O, through which the air is admitted to the pump. The upper end of the piston-rod O is provided with a collar w and with a screw-thread adapted to receive the corresponding screw-thread of the cap x, provided at its upper end with the foraminous plate y to prevent sand or other material from being drawn into the pump, and between the lower end of the cap x and the collar w is loosely placed the yoke-piece z, to the outer end of which the operating-strap J is attached, the said strap being made to pass around the outer side of the inner tube k, so that any outward movement of the said outer side of the tube will be imparted to the yoke-piece z and to the attached piston of the pump, thus causing the air to be forced from the chamber of the pump into the cavity H of the tube k, to cause the proper distention of the tire, and the loose connection of the yoke-piece z to the piston-rod O serves to allow for the lateral movement of the tread of the tire with relation to the rim B of the wheel without cramping the piston or interfering with the proper action of the pump in forcing air into the chamber H of the tire.

When the wheel of the velocipede has turned so as to carry the pump to its lowest position, the yielding tire at the point directly opposite the pump will be displaced inwardly by the pressure upon the ground caused by the weight of the rider and the vehicle, thus causing the upward expansion of the bulbs or the upward movement of the piston of the pump, and as soon as the tire is released from this pressure by the forward movement of the wheel the resilience of the yielding tire and the pressure of air within the same will serve to compress the bulbs or force the piston inward to cause the contained air to pass thence into the tire, and any surplus of air may be allowed to escape from the tire by means of the relief-valve, which may be adjusted to the specific pressure desired.

I claim as my invention—

1. The combination, with a yielding hollow tire, of an air-pump which is automatically operated to force air into the cavity of the tire by the outward movement of the said tire, substantially as described.

2. The combination, with a yielding hollow tire and an air-pump for forcing air into the cavity of the tire upon the outward movement of the said tire, of a band or strap which serves to connect the pump with the outer yielding portion of the tire, substantially as described.

3. The combination, with a yielding hollow tire and an air-pump for forcing air into the hollow of the tire upon the outward movement of the said tire, of a loosely-connected band or strap which serves to transmit movement from the yielding outer portion of the tire to the pump, whereby provision is made for the lateral movement of the tire without injurious action upon the pump, substantially as described.

4. The combination, with a yielding hollow tire, of a metal tube vulcanized in the wall of the said tire, an air-pump attached to the said tube, and means for operating the air-pump to force air into the cavity of the tire, substantially as described.

5. In a yielding hollow tire, the combination, with an inner circular tube adapted to retain the air under pressure, of an outer tube fitting the inner tube at one side and having a flat side which forms the tread of the tire, and the intervening ribs, which serve to prevent the collapse of the corners of the outer tube, substantially as described.

PARDON W. TILLINGHAST.

Witnesses:
SOCRATES SCHOLFIELD,
JOHN S. LYNCH.